United States Patent Office 3,161,629
Patented Dec. 15, 1964

3,161,629
PREPARATION OF POLYETHYLENE USING A CATALYST CONTAINING MONO-CYCLOPENTA-DIENYL TITANIUM TRICHLORIDE
Richard D. Gorsich, Baton Rouge, La., assignor to Ethyl Corporation, New York, N.Y., a corporation of Virginia
No Drawing. Filed Apr. 23, 1958, Ser. No. 730,270
1 Claim. (Cl. 260—94.9)

This invention relates generally to organo metal compounds and more particularly to cyclopentadienyl metal halide compounds of metals of Groups IVB, VB and molybdenum.

Up until very recently no stable organic metal compounds of the above metals had been known. A few cyclopentadienyl derivatives of these transition metals have recently been reported, such as, for example, cyclopentadienyl titanium monohalides (British Patent No. 768,083) and bis(cyclopentadienyl) titanium dihalides (British Patent No. 785,760).

Compounds of the above metals are believed to have a "sandwich-type" bond between the cyclopentadienyl group and the metal atom, i.e., the group being bonded to the metal atom through all of its 5-ring carbon atoms. In these compounds, the cyclopentadienyl group donates electrons to the metal such that the metal atom attains or approaches the electron configuration corresponding to that of the next higher rare gas, i.e., krypton in the case of titanium and vanadium, for example.

It is accordingly an object of this invention to provide new and novel compounds of metals of Groups IVB, VB and molybdenum and a process for their manufacture. Another object is to provide compounds of the above type which are both thermally and oxidatively stable. In addition, it is an object to provide compounds of this type having relatively good hydrolytic stability. Another object is to provide compounds of the above metals which have relatively good solubility in organic solvents and are useful in many applications, particularly as polymerization catalysts and as fuel additives, e.g. as antiknocks for gasoline for use in internal combustion engines. Other objects of the invention will become more apparent from the following description and appended claim.

It has now been found that these and other objects are accomplished by the provision of cyclopentadienyl metal halide compounds of metals of Groups IVB, VB, and molybdenum, the compounds containing either 3 or 4 halogens, depending upon the particular metal of the compound. More particularly, the compounds of this invention correspond to the general formula:

$$RMX_n$$

wherein R is a cyclopentadienyl moiety containing a 5-carbon atom ring similar to that found in cyclopentadiene itself, M is a metal selected from the group consisting of metals of Groups IVB, VB and molybdenum, X is a halogen including fluorine, chlorine, bromine and iodine, and $n$ is an integer from 3 to 4, inclusive. Astatine would also be expected to be suitable since it is a halogen but is presently believed impractical due to its instability.

The cyclopentadienyl metal halides of this invention are exceptionally thermally stable and are also unaffected at normal temperatures by both air and oxygen. In addition, these compounds are relatively insensitive to water, particularly in a solid or crystalline state. In solution, the compounds tend to hydrolyze, forming an insoluble precipitate which possibly explains their resistance to water in the solid state. These compounds have many uses including utility as polymerization catalysts and antiknocks. For this use, the relatively high thermal and oxidative stability make the compounds particularly suitable for convenient use as a blend in gasoline.

The compounds of this invention can be prepared by reacting a dicyclopentadienyl metal di- or tri-halide, depending upon the metal, with the corresponding metal tetra- or pentahalide. For example, cyclopentadienyl titanium trichloride can be prepared by reacting dicyclopentadienyl titanium dichloride with titanium tetrachloride. Likewise, cyclopentadienyl molybdenum tetrahalide can be prepared by reaction of dicyclopentadienyl molybdenum trichloride with molybdenum pentachloride. This reaction can be carried out with or without a catalyst at a temperature of 0° to 250° C., preferably at a temperature of 50° to 150° C. Generally the reaction is conducted in an inert atmosphere. The reaction can be carried out without solvent, particularly when at least one of the reactants is a liquid as in the case of titanium tetrachloride, but when all the reactants are solids, a solvent is preferably employed which is inert to the reactants and products. In general, the solvents suitable for this invention are aliphatic, cycloaliphatic or aromatic hydrocarbons, aliphatic, cycloaliphatic and aromatic chlorinated hydrocarbons, ethers including aliphatic, aromatic and polyethers including ethylene glycol dialkyl ethers, diethylene glycol dialkyl ethers and higher glycol ethers such as tri- and tetraethylene glycol diethylene ethers.

The above physical properties, such as thermal stability and high solubility, of the compounds of this invention are very unusual and unexpected. Based upon the well-known theories of N. V. Sidgwick ("The Chemical Elements and Their Compounds," Clarendon Press, Oxford, 1950) and W. Moffet (J. Am. Chem. Soc., vol. 76, 3386 (1954)), these compounds would not be expected to be stable. Considering titanium, for example, the known bis(cyclopentadienyl) titanium dichloride approaches the most stable configuration by either of the above theories. According to the Sidgwick theory, titanium needs 14 donated electrons to have an electron configuration similar to krypton and, in the above compound, 12 electrons are donated, theoretically. This is contrasted with the compounds of the present invention, e.g. cyclopentadienyl titanium trichloride wherein apparently only 8 electrons are donated. Thus, the compounds of this invention would not be predicted to exist, let alone have the relatively great stability actually exemplified by the present compounds. Likewise, it would not be expected that the compounds could be formed from bis(cyclopentadienyl) metal halides in which twice as many electrons are being donated to the metal by cyclopentadienyl groups.

Solubility in organic media is also greatly affected by the relative degree of donation of electrons in metallic compounds of this type. That is, in general, as the metal of the compounds approach or attain "rare gas structure," the solubility of the compound usually increases materially, at least in non-polar solvents. Moreover, the additional cyclopentadienyl group as for example in bis(cyclopentadienyl) titanium dichloride would be expected to give the compound much greater solubility in organic solvents due both to the presence of additional hydrocarbon moieties and to the expected increased stability of the titanium atom due to additional electron donation. Thus, the improved solubility in organic solvents of the compounds of this invention over known compounds is completely unexpected.

Typical examples of compounds which can be made in accordance with this invention are cyclopentadienyl titanium trichloride, cyclopentadienyl titanium trifluoride, cyclopentadienyl titanium tribromide, cyclopentadienyl titanium triiodide, cyclopentadienyl titanium triastatide, and corresponding metal halide compounds containing ethylcyclopentadienyl, butylcyclopentadienyl, octylcyclopentadienyl, dimethylcyclopentadienyl, dihexylcyclopentadienyl, vinylcyclopentadienyl, ethynyl cyclopentadienyl, phenyl cyclopentadienyl, methylphenyl cyclopentadienyl, acetylcyclopentadienyl, allylcyclopentadienyl, benzylcyclopentadienyl, tolylcyclopentadienyl and other like radicals.

Other cyclopentadienyl metal halide compounds of this invention are cyclopentadienyl zirconium trichloride, methylcyclopentadienyl zirconium tribromide, cyclopentadienyl hafnium trichloride, phenyl cyclopentadienyl hafnium trifluoride, cyclopentadienyl vanadium trichloride, vinyl cyclopentadienyl vanadium triiodide, methylcyclopentadienyl vanadium tribromide, cyclopentadienyl niobium tetrachloride, methylcyclopentadienyl niobium tetrabromide, cyclopentadienyl tantalum tetrachloride, methylcyclopentadienyl tantalum tetrachloride, octylcyclopentadienyl tantalum tetrabromide, phenylcyclopentadienyl tantalum tetrachloride, cyclopentadienyl molybdenum tetrachloride, methylcyclopentadienyl molybdenum tetrachloride, octylcyclopentadienyl molybdenum tetrabromide and the like.

In general, the preferred compounds of this invention have 3 halogens in all compounds containing titanium, zirconium, hafnium and vanadium, whereas the compounds have 4 halogens in compounds containing one of the metals, niobium, tantalum and molybdenum.

In the preferred compounds of the present invention the cyclopentadienyl moiety contains from 5 to 15 carbon atoms and includes not only alkyl and aryl substituted cyclopentadienyl groups but also includes indenyl and fluorenyl derivatives including substituted indenyl and fluorenyl derivatives.

As pointed out above, the compounds of this invention can be prepared by reacting a dicyclopentadienyl metal dihalide of metals including titanium, zirconium, hafnium and vanadium with the corresponding metal tetrahalide or by reacting the dicyclopentadienyl metal trihalide of metals of niobium, tantalum and molybdenum with the corresponding metal pentahalide. The dicyclopentadienyl metal di- or tri-halides can be prepared by a number of known techniques such as those disclosed in British Patent No. 785,760. A preferred method of preparation involves reaction of the corresponding cyclopentadienyl alkali metal compound or with a cyclopentadienyl Grignard with the tetra- or pentahalide of the corresponding metal.

The present reaction can be conducted at temperatures of 0° to 250° C. with or without an inert solvent. The solvents particularly suitable for this invention are aliphatic, cycloaliphatic and aromatic hydrocarbons, chlorinated hydrocarbons, ethers including aliphatic, aromatic and cyclic ethers as well as poly ethers such as ethylene glycol, diethylene glycol and triethylene glycol ethers. In addition, certain amines and acetals are also suitable solvents.

Typical examples of suitable solvents for the present invention are hexane, decane, cyclohexane, benzene, toluene, xylene, mesitylene, ethyl benzene, diethyl benzene, trichlorobenzene, chloroform, carbon tetrachloride, dimethyl ether, diethyl ether, dibutyl ether, methyl ethyl ether, ethylene glycol dimethyl ether, ethylene glycol diethyl ether, diethylene glycol dimethyl ether, diethylene glycol diethyl ether, diethylene glycol dibutyl ether, diethylene glycol methyl ethyl ether, triethylene glycol dimethyl ether and tetraethylene glycol dimethyl ether.

Other typical examples of suitable solvents are tetrahydrofuran, dicyclohexylamine, methylal, and the like.

The quantity of solvent can range from about molar equivalents or below to several equivalents, e.g. about 10 moles of solvent per mole of reactants. More dilute concentrations can be employed effectively except that greater difficulties are encountered in recovery of the product. More concentrated solutions can also be used where the product tends to crystallize out but, with some systems the reaction mixtures are rather viscous and difficult to handle.

The following examples illustrate the preparation of compounds of this invention. In these examples, all parts are given in parts by weight.

*Example I*

A reaction vessel equipped with a mechanical stirrer, reflux condenser and nitrogen inlet tube was purged with dry nitrogen and was thereafter charged with 19.4 parts of bis(cyclopentadienyl) titanium dichloride, 155 parts p-xylene and 52.8 parts of titanium tetrachloride. The mixture was heated with stirring between 115° and 120° C. for 24 hours. A nitrogen atmosphere was maintained over the reaction mixture during this period. The mixture was then allowed to cool to room temperature and the resulting greenish-yellow prisms were filtered off. The crystals of cyclopentadienyl titanium trichloride were washed with several portions of petroleum ether (boiling point 30° to 60° C.) and then dried in a vacuum desiccator at approximately 15 millimeters of mercury at room temperature for 3 hours. The yield of product was 27 parts. Crystallization from methylene chloride gave yellow prisms which are stable up to temperatures of about 135° C. The compound had a chloride content of 47.96 weight percent, corresponding to a theoretical analysis of 48.49 weight percent. The yellow crystals react only very slowly with water and can be worked up without hydrolysis in the presence of air. The compounds are soluble generally in organic solvents including benzene, carbon tetrachloride, alcohols, tetrahydrofuran and acetals. The compound is unaffected by nitric acid or a mixture of nitric and hydrochloric acids. It dissolves in concentrated sulfuric acid.

The cyclopentadienyl titanium trichloride produced as above is an effective catalyst for polymerization of olefins. As an example of this utility, 50 parts of the cyclopentadienyl titanium trichloride prepared as above is mixed with equal mole quantities of aluminum triethyl in hexane solvents (250 parts) and gaseous ethylene at 300 pounds per square inch is fed to the reactor, while continuously stirring the reaction mixture after the ethylene consumption has essentially ceased. The reaction mixture is then washed with alcoholic HCl to precipitate a white solid polyethylene polymer. Excellent yields of polymer are obtained by employing the titanium compounds of this invention.

The bis(cyclopentadienyl) titanium dichloride employed in the above reaction was prepared in accordance with the procedure given in J. Am. Chem. Soc., vol. 76, 4179 (1954).

*Example II*

Example I is repeated except that bis(methylcyclopentadienyl)titanium dibromide is reacted with titanium tetrabromide in 200 parts of diethylene glycol dimethyl ether. The reaction is conducted at 150° C. The methylcyclopentadienyl titanium tribromide is obtained in good yield.

*Example III*

Example I is repeated except that bis(benzylcyclopentadienyl)titanium dichloride is reacted in 150 parts of mesitylene with titanium tetrachloride at 130° C. The product benzyl cyclopentadienyl titanium trichloride is worked up in accordance with the procedure of Example I and is obtained in good yield.

*Example IV*

Cyclopentadienyl titanium trichloride is prepared in accordance with the procedure of Example I except that no solvent is employed and 100 parts of titanium tetrachloride is employed. The reaction is conducted at 90° C. The crude product is filtered in a nitrogen atmosphere and the crystals were thereafter purified in accordance with the procedure of Example I. A good yield of product was obtained.

*Example V*

Octylcyclopentadienyl zirconium trifluoride is prepared by reacting in accordance with the procedure of Example I bis(octylcyclopentadienyl) zirconium difluoride with zirconium tetrafluoride in 100 parts of decane at 130° C. The molar ratio of the bis(octylcyclopentadienyl) zirconium difluoride to the zirconium tetrafluoride is 1:3. The product is recovered in excellent yield. The octylcyclopentadienyl zirconium trifluoride can also be prepared from the corresponding chloride by treatament with anhydrous hydrogen fluoride.

*Example VI*

Example I is repeated except that bis(vinylcyclopentadienyl) niobium tribromide is reacted with niobium pentabromide in trichlorobenzene solvent at 0° C. The product cyclopentadienyl niobium tetrabromide is obtained in good yield.

*Example VII*

Example I is repeated except that bis(acetylcyclopentadienyl)molybdenum trichloride is reacted with molybdenum pentachloride in dichlorooctane at 100° C. The acetylcyclopentadienyl molybdenum tetrachloride is obtained in good yield.

In the above example, essentially stoichiometric equivalent quantities of the cyclopentadienyl metal halide and the corresponding metal halide are employed. In general, in the above examples, the quantity of cyclopentadienyl metal halide can range from about 0.5 to about 2 mole equivalents per mole equivalent of the metal halide to give similar results. More specifically, in reacting bis(cyclopentadienyl)titanium trichloride with titanium tetrachloride, for example, the concentration of bis(cyclopentadienyl)titanium dichloride can be from 0.5 to about 2 moles per mole of titanium tetrachloride. Lesser or greater quantities of bis(cyclopentadienyl)titanium trichloride can be employed although the yields of the desired product are somewhat reduced.

I claim:

The process of preparing polyethylene which comprises subjecting ethylene to polymerization in the presence of a co-catalyst system consisting essentially of (A) monocyclopentadienyl titanium trichloride and (B) triethyl aluminum.

References Cited by the Examiner

UNITED STATES PATENTS

| | | | |
|---|---|---|---|
| 2,818,416 | 12/57 | Brown et al. | 260—429 |
| 2,864,843 | 12/58 | Witt | 260—429 |
| 2,868,751 | 1/59 | Johnson | 260—429 |
| 3,038,915 | 6/62 | Barkdoll et al. | 260—429 |

FOREIGN PATENTS

| | | |
|---|---|---|
| 793,354 | 4/58 | Great Britain. |

OTHER REFERENCES

Herman et al.: "J.A.C.S." 75, 3882–3887 (1953).

J. L. SCHOFER, *Primary Examiner.*

A. H. WINKELSTERN, T. E. LEVOW, L. H. GASTON, *Examiners.*